United States Patent
Seki et al.

(10) Patent No.: US 7,116,033 B2
(45) Date of Patent: Oct. 3, 2006

(54) CONTROL APPARATUS AND PROGRAM

(75) Inventors: Hiroyuki Seki, Tochigi (JP); Kosuke Fujimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 10/872,526

(22) Filed: Jun. 22, 2004

(65) Prior Publication Data

US 2004/0262925 A1   Dec. 30, 2004

(30) Foreign Application Priority Data

Jun. 30, 2003   (JP) .............................. 2003-186653

(51) Int. Cl.
*H02N 2/14* (2006.01)
*H02N 2/06* (2006.01)
(52) U.S. Cl. ............. 310/317; 310/316.01; 310/323.16
(58) Field of Classification Search ........... 310/316.01, 310/317, 323.16
See application file for complete search history.

(56) References Cited

U.S. PATENT DOCUMENTS

| | | | | |
|---|---|---|---|---|
| 5,841,215 A | * | 11/1998 | Takeishi ................ | 310/316.01 |
| 5,917,268 A | * | 6/1999 | Takagi ......................... | 310/317 |
| 5,986,383 A | * | 11/1999 | Hasuda et al. .............. | 310/317 |
| 6,037,701 A | * | 3/2000 | Atsuta .................... | 310/316.01 |
| 6,100,622 A | * | 8/2000 | Yamamoto et al. ..... | 310/316.01 |
| 6,885,132 B1 | * | 4/2005 | Takemura et al. ...... | 310/316.01 |
| 6,989,624 B1 | * | 1/2006 | Tsukimoto et al. .... | 310/323.12 |
| 2002/0033322 A1 | * | 3/2002 | Nakano et al. ............. | 200/237 |
| 2002/0171330 A1 | * | 11/2002 | Kato et al. .................. | 310/328 |
| 2003/0006722 A1 | * | 1/2003 | Hayashi ..................... | 318/114 |
| 2003/0107299 A1 | | 6/2003 | Fujimoto et al. ...... | 310/323.03 |
| 2004/0124742 A1 | * | 7/2004 | Takemura et al. .......... | 310/317 |
| 2005/0116583 A1 | * | 6/2005 | Nishio et al. ............... | 310/317 |
| 2006/0001330 A1 | * | 1/2006 | Matsuzaki et al. ..... | 310/316.01 |

FOREIGN PATENT DOCUMENTS

JP     2001-25271 A     1/2001

* cited by examiner

*Primary Examiner*—Darren Schuberg
*Assistant Examiner*—J. Aguirrechea
(74) *Attorney, Agent, or Firm*—Fitzpatrick, Cella, Harper & Scinto

(57) ABSTRACT

When starting a vibration-type drive device, the frequency of a drive signal is lowered from a predetermined frequency at a first change rate. When the vibration state of a vibration member reaches a predetermined state, it is determined whether or not a relative movement speed has reached a reference speed. When the relative movement speed has not reached the reference speed, the frequency of the drive signal is lowered at a second change rate that is smaller than the first change rate. This avoids problems which could occur when moisture intervenes on a slide surface of the vibration-type drive device, such as the vibration-type drive device not starting, and a desired rpm not being achieved.

8 Claims, 9 Drawing Sheets

CONTROL APPARATUS AND PROGRAM

BACKGROUND OF THE INVENTION

1. Field of the Invention

The present invention relates to a control apparatus and a control program for controlling drive of a vibration-type drive device at start-up.

2. Related Background Art

Recently, vibration-type motors have been used not only as actuators in camera lenses, but also as actuators to drive calendars in watches, to drive photosensitive drums in copiers, etc. Further, examples of the shape (constructions) of a vibration member in vibration-type motors include a ring shape, a rod shape, a disc shape, and many others.

A general method of driving a vibration-type motor is shown in flowchart in FIG. 5 (see Japanese Patent Application Laid-Open No. 2001-25271, for example). Furthermore, FIG. 6 shows a pattern diagram of a frequency, a phase difference (the phase difference between an input voltage Va to the vibration-type motor (piezoelectric element) and an output voltage Vs of the sensor phase provided to the piezoelectric element), and the rotation number (speed) of a rotor (hereinafter referred to as the "rotor rpm") when the vibration-type motor starts normally.

In FIG. 6, a horizontal axis shows time (ms), and a vertical axis shows frequency (kHz), rotor rpm, and the above-mentioned phase difference $\theta$a-s.

When the vibration-type motor starts, the frequency starts at the maximum frequency fmax within the frequency control range of the circuit (step S501 in FIG. 5), and with a predetermined sweep down rate R1 (Hz/sec) the frequency is swept down (step S502 in FIG. 5). Then, when an encoder or the like detects (by pulse detection) that the vibration-type motor (the rotor) has started to rotate (step S503 in FIG. 5), the phase difference $\theta$a-s is calculated (step S504 in FIG. 5). Here, when the calculated phase difference $\theta$a-s exceeds a predetermined phase difference P2 (step S505 in FIG. 5), the frequency sweep is stopped (step S506 in FIG. 5).

Subsequently, with a frequency f1 where the frequency sweep stopped serving as a reference, the motor is driven to a target point while controlling the frequency so that the phase difference $\theta$a-s falls between the above-mentioned phase difference P2 and a predetermined phase difference P1.

However, there is a fear that, when trying to start the vibration-type motor in a highly humid environment, it will not start on the first try, or it will only run at a very slow speed. This problem arises because, when the vibration-type motor is left in high humidity, trace amounts of moisture attach to minute gaps between the frictional surface between the vibration member and the rotor. This causes the vibration member and rotor friction coefficient to drop, reducing the torque generated when the motor starts. In particular, when using a SUS material, aluminum or other friction materials which have superior wear resistance and involves extremely little wear, the decrease in torque occurs more easily.

When the motor is in a low-torque state such as described above, in the conventional control method, sometimes the vibration-type motor cannot be started normally. That is, as shown in FIG. 7, even when the frequency is swept down from a high frequency (fmax) upon motor start-up and the friction amplitude of the vibration member has increased to a sufficiently large value V1 (frequency is f1), the rotor rpm (N1) is almost 0 due to the moisture and the like on the frictional surface.

In this case, the drive pattern is such that as the frequency is further dropped from the frequency f1, it eventually sweeps down to the minimum frequency (fmin) where the drive ends.

Here, since the vibration-type motor is driven by the frictional force between the vibration member and the rotor, the frictional heat on the frictional surface becomes extremely high, and when driven in a steady state the temperature on the friction surface reaches hundreds of degrees. However, when moisture intervenes on the frictional surface, within a short time period after the vibration-type drive device begins to start, the frictional heat generated on the slide surface is also very small and the conventional control method cannot eliminate the moisture.

As a common solution to the situation where moisture is present on the slide surface, the pressure applied to the contact surface between the vibration member and the rotor is increased so as to raise the surface pressure on the contact surface to thereby eliminate the moisture, or the frictional surface is roughed (creating concaves and convexes) to minimize the influence of the moisture.

However, in the vibration-type motor, simply raising just the applied pressure increases the load on the frictional surface, and thus increases wear. Moreover, since a load also bears on the bearing that receives the reaction force when the pressure is applied, the durability of the bearing deteriorates and damage to the bearing increases. Furthermore, when the slide surface is simply roughened, this increases the wear of the frictional surface, which detracts from the durability of the vibration-type motor.

SUMMARY OF THE INVENTION

According to the present invention, there is provided a control apparatus for controlling drive of a vibration-type drive device in which a vibration member excited by receiving an input of a drive signal and a contact member brought into contact under pressure with the vibration member can move relative to each other, the control apparatus including: a vibration detection unit which detects a vibration state of the vibration member; a speed detection unit which detects a relative movement speed between the vibration member and the contact member; and a control unit which outputs the drive signal to the vibration member to control drive of the vibration-type drive device, characterized in that the control unit performs: a first frequency control step of lowering a frequency of the drive signal from a predetermined frequency at a first change rate, when the vibration-type drive device is started; a determining step of, when the vibration state detected by the vibration detection unit becomes a predetermined state in accordance with a change in the frequency in the first frequency control step, determining whether or not the relative movement speed detected by the speed detection unit has reached a predetermined reference speed; a second frequency control step of, when it is determined in the determining step that the relative movement speed has not reached the reference speed, lowering the frequency of the drive signal at a second change rate which is smaller than the first change rate; and a third frequency control step of, when the relative movement speed has reached the reference speed, changing the frequency of the drive signal such that the relative movement speed reaches a target speed.

That is, at the time when the vibration-type drive device starts, if the frequency is changed at the first change rate but the relative movement speed still does not increase due to moisture, etc. on the frictional surface of the vibration-type drive device, the frequency is changed at the second change rate which is smaller than the first change rate, thereby securing sufficient time for the frictional heat generated on the frictional surface to eliminate the moisture.

Furthermore, it is also possible for a program to cause a computer to execute the processing operations of the above-mentioned control circuit.

DESCRIPTION OF THE PREFERRED EMBODIMENTS (First Embodiment)

FIGS. 1 through 3 and 8A through 10 are used to explain a control apparatus of a vibration-type motor, according to a first embodiment of the present invention.

Figures 8A, 8B:
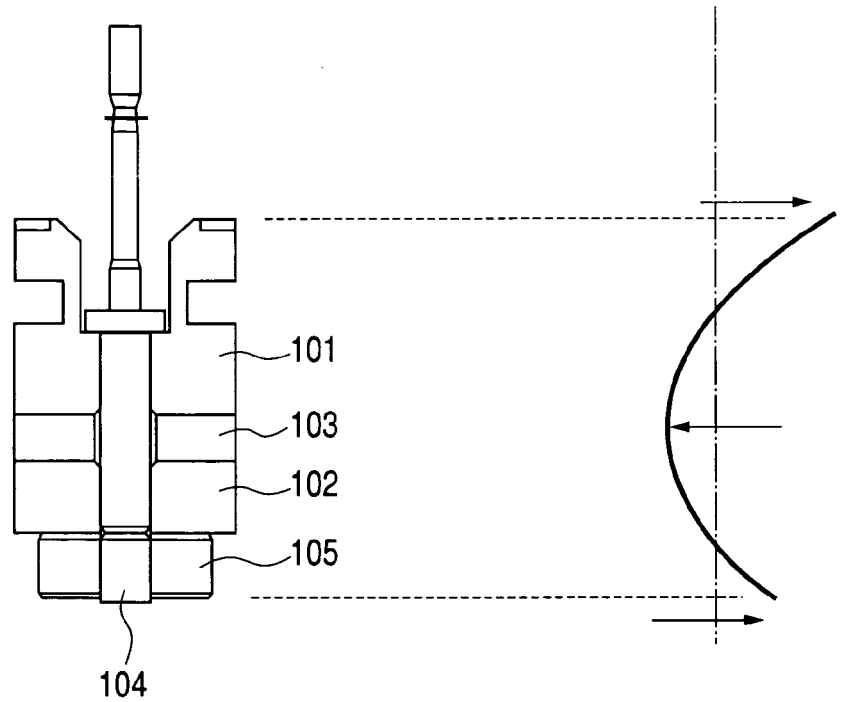
FIG. 8A is an external view of a rod-shaped vibration-type motor.
FIG. 8B is a diagram illustrating a vibration mode.
Figure 9:
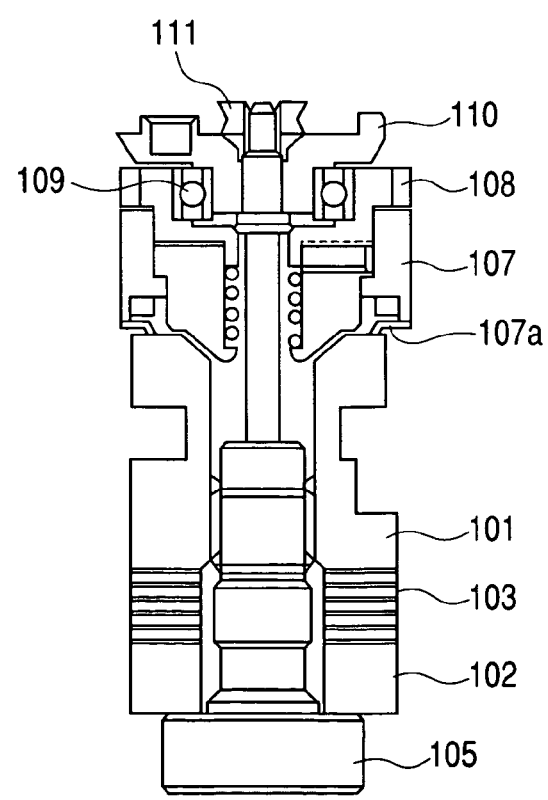
FIG. 9 is a cross-sectional view of the above-mentioned vibration-type motor.
Figure 10:
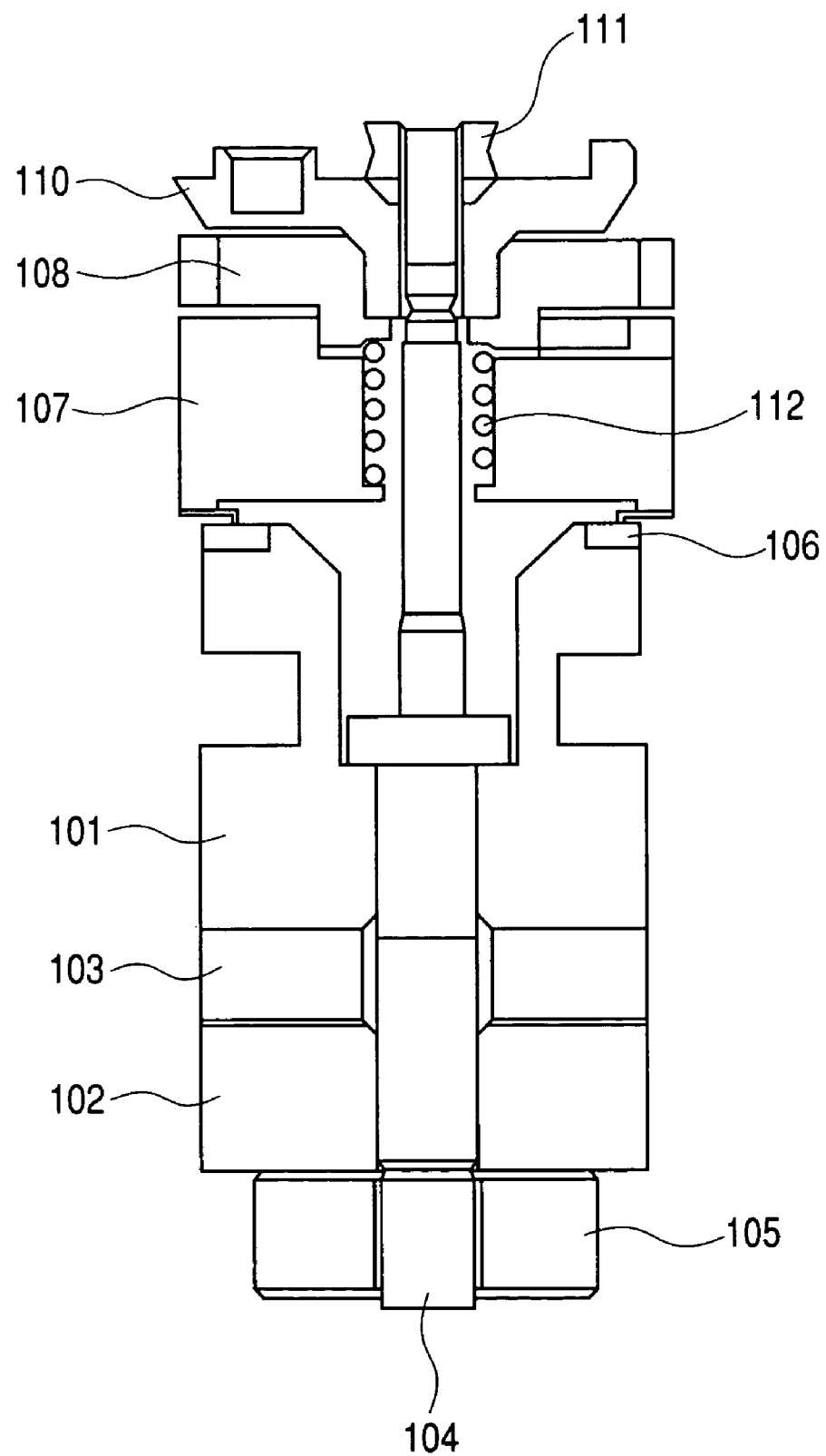
FIG. 10 is an external view of the above-mentioned vibration-type motor.
Figure 5:
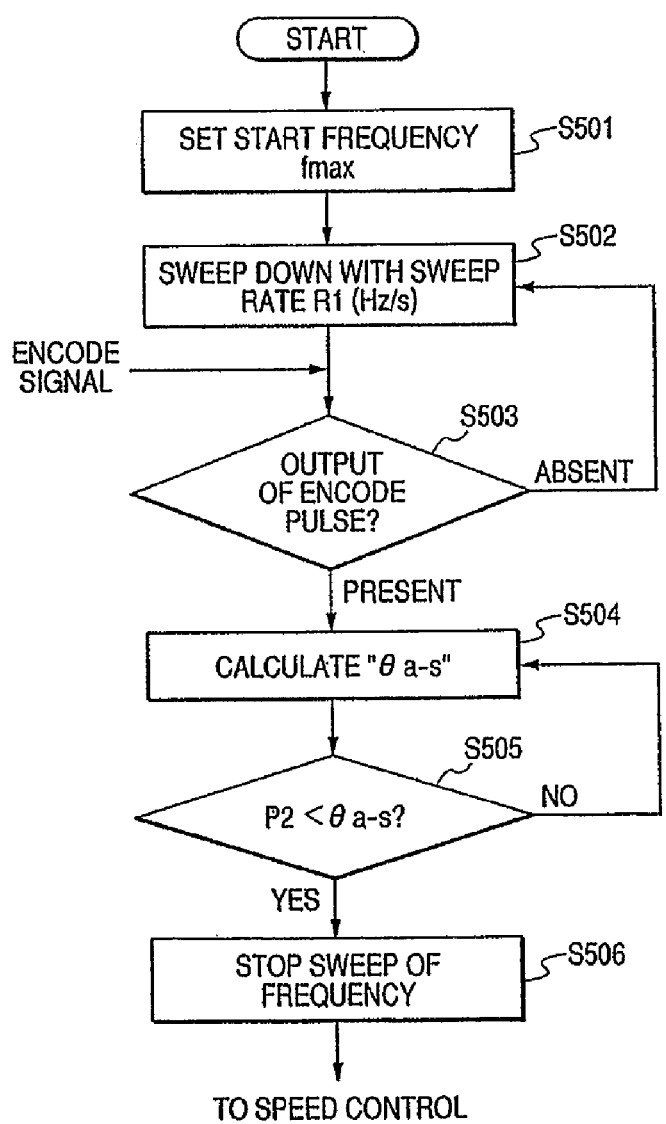

FIGS. 8A through 10 are explanatory diagrams of a rod-shaped vibration-type motor. FIG. 8A shows a construction of a rod-shaped vibration member, and FIG. 8B shows a vibration mode of the vibration member. FIGS. 9 and 10 are constructional diagrams of the vibration-type motor having the vibration member shown in FIGS. 8A and 8B. The vibration-type motor is used as an actuator for driving a lens provided to a camera, for example.

In FIGS. 8A through 10, reference numeral 101 denotes a first elastic member, and reference numeral 102 denotes a second elastic member. Reference numeral 103 denotes a multi-layer piezoelectric element (or a multi-layer member with single-layers of piezoelectric elements) which serves as an electro-mechanical energy conversion element, and is sandwiched between the first elastic member 101 and the second elastic member 102.

Reference numeral 104 denotes a shaft, and reference numeral 105 denotes a nut. The shaft 104 and the nut 105 bind the first elastic member 101, the second elastic member 102, and the multi-layer piezoelectric element 103 so as to squeeze them with a given amount of force.

Reference numeral 107 denotes a rotor (contact member). One surface (the bottom surface in FIG. 9) is formed with a contact portion 107a. The contact portion 107a is arranged so as to make contact with a frictional piece 106 that is provided to an end surface of the first elastic member 101, and has a structure with a small contact width and appropriate springiness. Further, the other surface of the rotor 107 (the top surface in FIG. 9) is formed with a convex portion (or concave portion) that engages with a concave portion (or convex portion) of a gear 108.

Reference numeral 108 denotes a gear that rotates together with the rotor 107 and transmits the output from the vibration-type motor. The gear 108 is held in position at a thrust direction across the shaft 104 by means of a flange 110 that mounts the vibration-type motor. Reference numeral 111 denotes a nut that fixes an end portion of the shaft 104 to the flange 110. Reference numeral 112 denotes a pressure spring that applies pressure to the rotor 107 and is provided between the gear 108 and the rotor 107.

Reference numeral 109 denotes a bearing which is fixed to the gear 108 and regulates the position of the shaft 104.

The multi-layer piezoelectric element 103 has two grouped electrode groups (areas divided into + and −). When AC voltages with different phases are applied to each electrode group from an electrical source (not shown), the vibration member is excited with a curved vibration shown in FIG. 8B, and a vibration that is curved similarly to the curved vibration and occurs at an angle perpendicular to the surface of the paper.

Here, by adjusting the phases of the applied voltages, it is possible to create a 90° chronological phase difference between the two curved vibrations. As a result, a curved vibration of the vibration member is generated around the axis of the vibration member.

Accordingly, elliptic movement is formed on the upper surface of the first elastic member 101, which makes contact with the rotor 107. The rotor 107, being pressed against the friction-resistant frictional piece 106, creates frictional drive. Thus, the rotor 107, the gear 108, and the pressure spring 112 rotate as a single unit.

Figure 1:
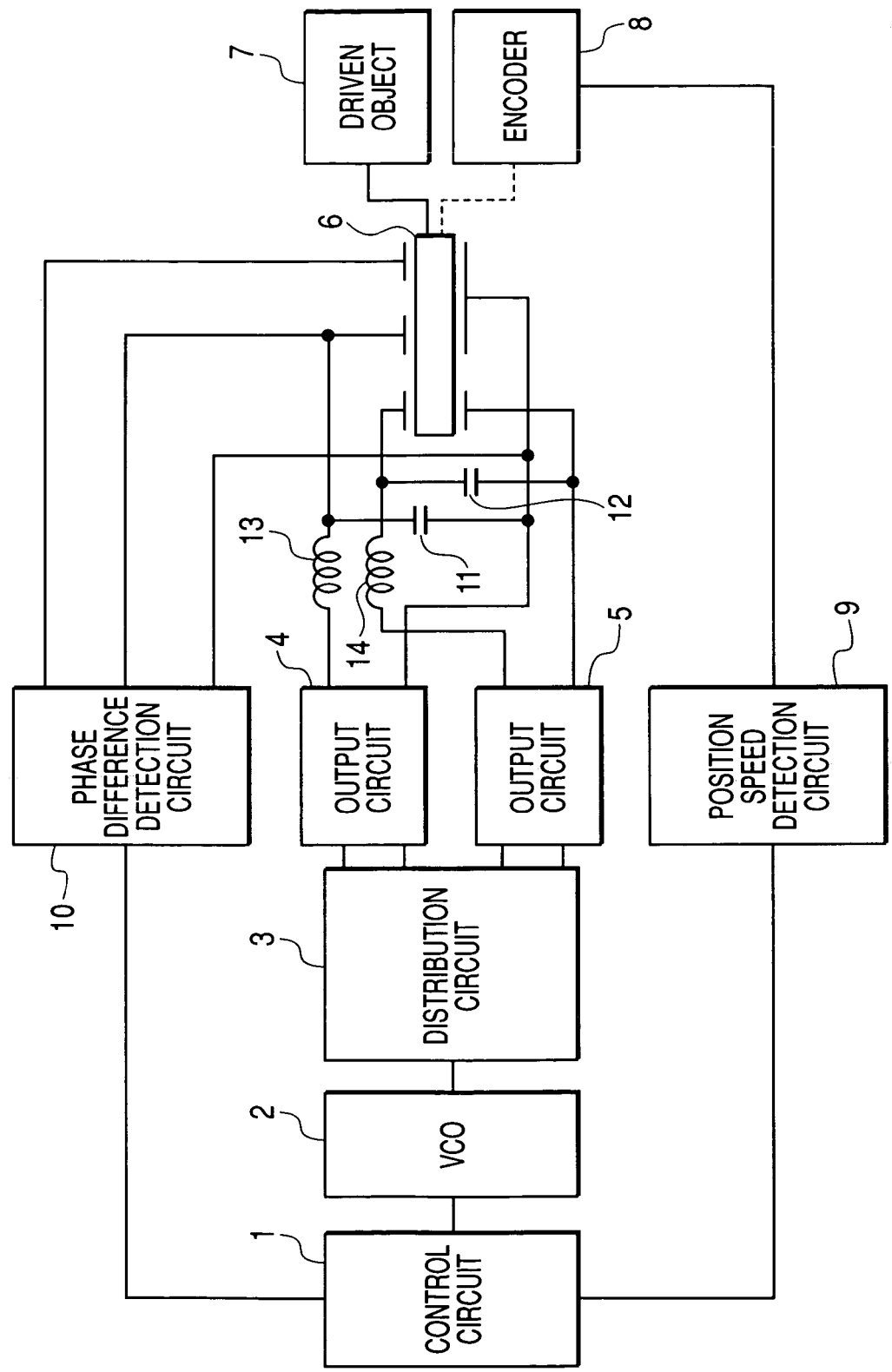
FIG. 1 is a block diagram of a control apparatus according to a first embodiment of the present invention.

FIG. 1 is used to explain a construction of the control apparatus of the vibration-type motor according to the present invention.

In FIG. 1, reference numeral 1 denotes the control circuit. Reference numeral 2 denotes a voltage control oscillator (VCO), which outputs a frequency voltage corresponding to the output from the control circuit 1. Reference numeral 3 denotes a distribution circuit, which divides the frequency voltage of the VCO 2 to output signals at a π/2 phase difference.

Reference numerals 4 and 5 denote output circuits, which amplify the frequency voltage of the distribution circuit 3 to a voltage and electric current value that can drive the vibration-type motor 6.

The output signals from the output circuits 4 and 5 are inputted to the multi-layer piezoelectric element 103 provided to the vibration member of the vibration-type motor 6 and excite the above-mentioned curved vibration in the vibration member. This rotates the rotor 107 which is slidably or frictionally pressed against the vibration member. The rotation of the rotor 107 is transmitted through a force transmission mechanism (not shown) to a driven object 7 such as a photosensitive drum of a copier, a lens barrel of a camera, or the like, thus driving the driven object 7.

Reference numeral 8 denotes an encoder that detects the rotation of the rotor 107. The encoder 8 is constituted by a slitted light-shielding plate that rotates together with the vibration-type motor, and a photo-interrupter that detects the rotation of the light-shielding plate. Reference numeral 9 denotes a position speed detection circuit that detects the rotational position and number of rotations of the vibration-type motor (the rotor 107), based on an output from the encoder 8. Detection results from the position speed detection circuit 9 are sent to the control circuit 1.

Reference numeral 10 denotes a phase difference detection circuit, which detects the phase difference between the signals inputted from the output circuits 4 and 5 to the vibration-type motor 6 (the multi-layer piezoelectric element 103), and the output signal from the feedback sensor phase ("S" phase) provided to the multi-layer piezoelectric element 103. These detection results are sent to the control circuit 1.

Reference numerals 11 and 12 denote capacitors, which use coils 13 and 14 to increase the voltage of the signal inputted to the vibration-type motor (the multi-layer piezoelectric element 103).

The control circuit 1 performs drive control on the vibration-type motor as descried below, based on the outputs from the position speed detection circuit 9 and the phase difference detection circuit 10. Further, the control circuit 1 detects the vibration amplitude of the vibration member based on an output voltage (Vs) from the sensor phase.

In this embodiment, description is given regarding a driving method performed after the vibration-type motor is started from a stopped state, up to the point where control begins at a predetermined speed. The drive controls, stop operations, and the like that are performed on the motor after that point are similar to the conventional techniques.

For example, after the vibration-type motor is started, speed controls and phase controls are used to control the speed of the vibration-type motor closer to a desired rotation speed. Speed controls stop the motor drive.

Here, the above-mentioned speed controls detect the rotation speed of the vibration-type motor at given periods, compare the detected rotation speed and the desired rotation speed, raise the drive frequency by a predetermined value when the actual rotation speed is faster than the desired rotation speed, and lower the drive frequency by a predetermined value when the actual rotation speed is slower than the desired rotation speed, thereby controlling the rotation speed of the vibration-type motor.

Further, the above-mentioned phase controls detect the frequency voltage inputted to the piezoelectric element and the phase difference of the frequency voltage from the sensor piezoelectric element, and then control the frequency based on the phase difference information that was attained.

Figure 2:
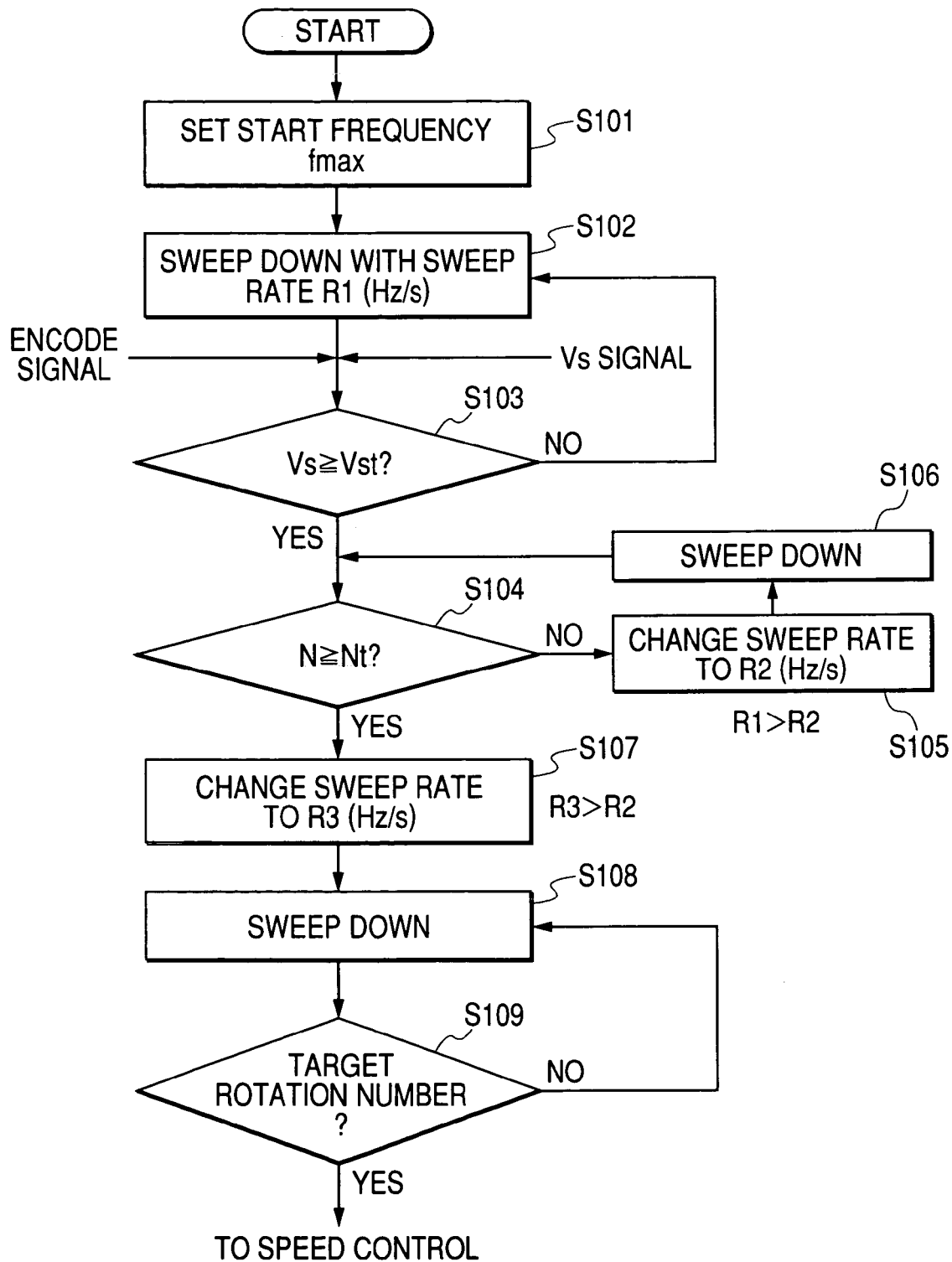
FIG. 2 is a flowchart showing operations when starting a motor according to the first embodiment.
Figure 3:
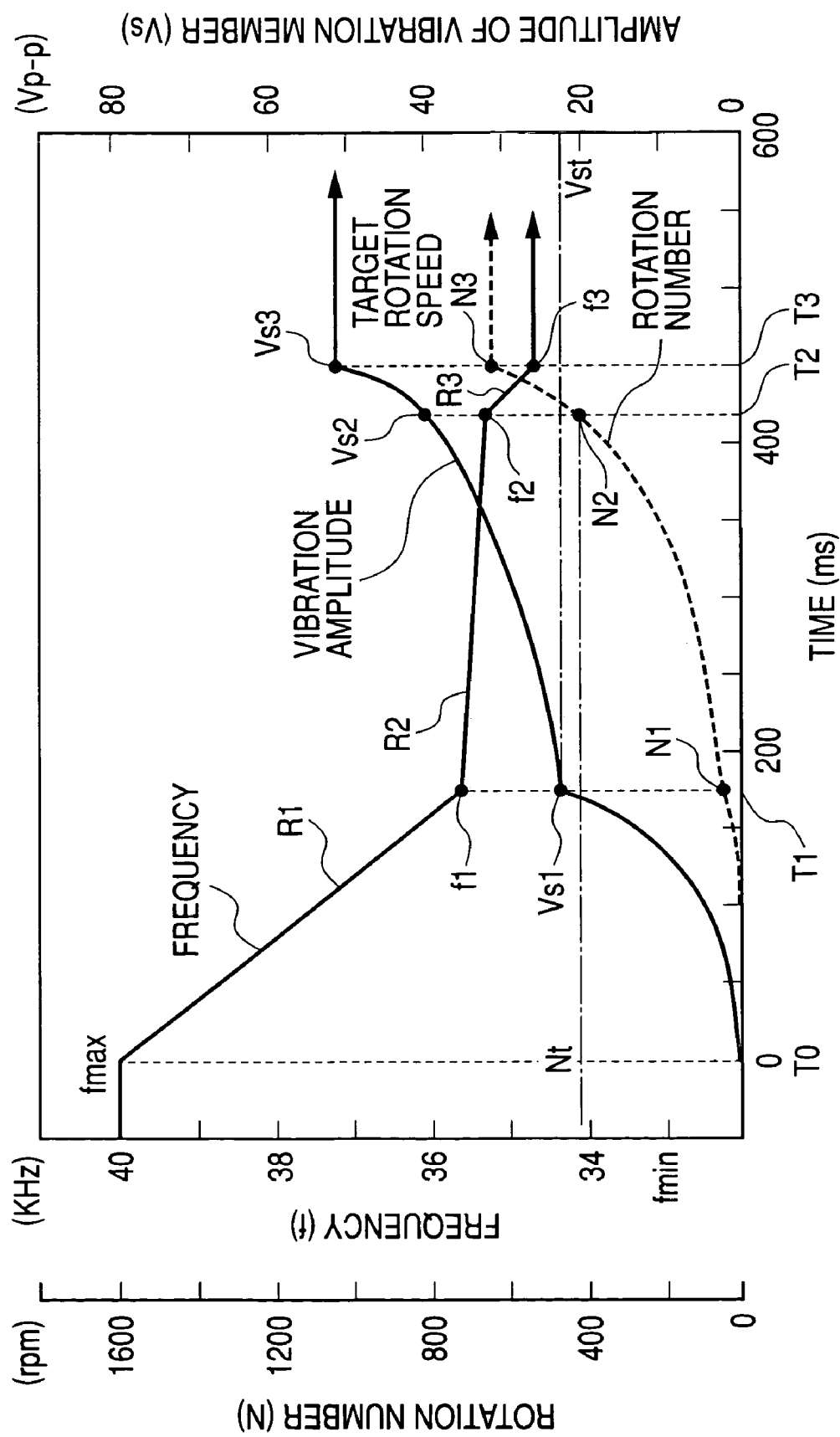
FIG. 3 is a timing chart when starting the motor according to the first embodiment.

FIG. 2 is a flowchart of controls at the time when the vibration-type motor is started. FIG. 3 is a diagram showing a time chart of a frequency, an "S" phase voltage Vs, and a rotor rotation number (hereinafter referred to as the "motor rpm") N.

In FIG. 2, at step S101, the frequency is set to the maximum frequency fmax within the frequency control range (frequency greater than the resonance frequency of the vibration member), and the vibration-type motor starts to be driven.

Note that, the frequency at the start of the drive on the vibration-type motor does not have to be set to fmax, but may be set to another given frequency. For example, it is possible to store the frequency from the previous time when the motor was started, to set the frequency that can drive the vibration-type motor (i.e., rotate the rotor 107) without fail. Accordingly, the vibration-type motor can be started to a given number of rotations in a short time.

At step S102, the frequency is swept down at a sweep rate R1 (Hz/s), and the output signal and a vibration amplitude Vs from the encoder 8 are monitored.

At step S103, it is determined whether or not the vibration amplitude Vs is equal to or greater than a predetermined vibration amplitude Vst. When Vs is greater than Vst, the processing advances to step S104.

At step S104, the rotation number (hereinafter referred to as the "rpm") N of the rotor 107 is detected based on the output from the encoder, to determine whether or not the rpm N is equal to or greater than a predetermined rpm Nt. Here, when N is equal to or greater than Nt, the processing advances to step S107. When N is less than Nt, the processing advances to step S105.

FIG. 3 shows a case where, because the moisture and the like are intervening on the frictional surface in the vibration-type motor, the rpm N has not reached the predetermined rpm Nt at a time T1 when the amplitude Vs reaches the predetermined amplitude Vst (Vs1). N1 indicates the rpm at this time.

At step S105, the sweep rate is changed from R1 to R2. Here, the sweep rate R2 is smaller than the sweep rate R1. In FIG. 3, a frequency f1 is a threshold where the sweep rate changes from R1 to R2.

At step 106, the frequency is swept down at the sweep rate R2.

At step S107, the sweep rate changes to R3. Here, the value of the sweep rate R3 can be set as needed, but in order to quickly raise the rpm to the target rpm (N3 of FIG. 3), the sweep rate R3 should be greater than the sweep rate R2.

As shown in FIG. 3, when the moisture is present on the frictional surface of the vibration-type motor, the sweep rate switches from R1 to R2, and the frequency is changed according to R2, whereby the friction between the vibration member and the rotor can eliminate the moisture on the frictional surface. When the moisture is eliminated, the rpm N gradually rises and reaches the predetermined rpm Nt. After this point, the sweep rate can be switched to R3 so that the rpm can reach the target rpm quickly.

Performing the controls described above eliminates the problem in that the vibration-type motor drive stops before the rpm rises, as described with respect to the conventional technique.

At step S108, the frequency sweeps down at the sweep rate R3. At step S109, it is determined whether or not the rpm N has reached the target rpm (N3 of FIG. 3). Here, before the rpm N reaches the target rpm, the sweep down continues at the sweep rate R3. When the rpm N reaches the target rpm (T3 of FIG. 3) the sweep down stops, and the drive control on the vibration-type motor begins.

In this embodiment, the rotor rpm N was used as the reference to determine when to switch the sweep rate, but the present invention is not restricted to this configuration. Rather, any method can be used provided that it can judge whether or not the vibration-type motor is driving. For example, the number of pulses from the encoder can serve as the determination reference, and the sweep rate can be switched when 5 or more pulses are outputted at the time T1 in FIG. 3.

According to this embodiment, in a normal environment (i.e., an environment without high humidity), the rpm rises as the frequency changes, so the vibration-type motor can be started rapidly, without delays while starting. On the other hand, under poor conditions such as a high-humidity environment, by starting the vibration-type motor gradually in a high-amplitude state, the frictional heat generated on the slide surface by driving the vibration-type motor can eliminate the moisture present on the frictional surface. Accordingly, the vibration-type motor returns to the state where the rotor can rotate without fail and can be driven.

(Second Embodiment)

Figure 4:
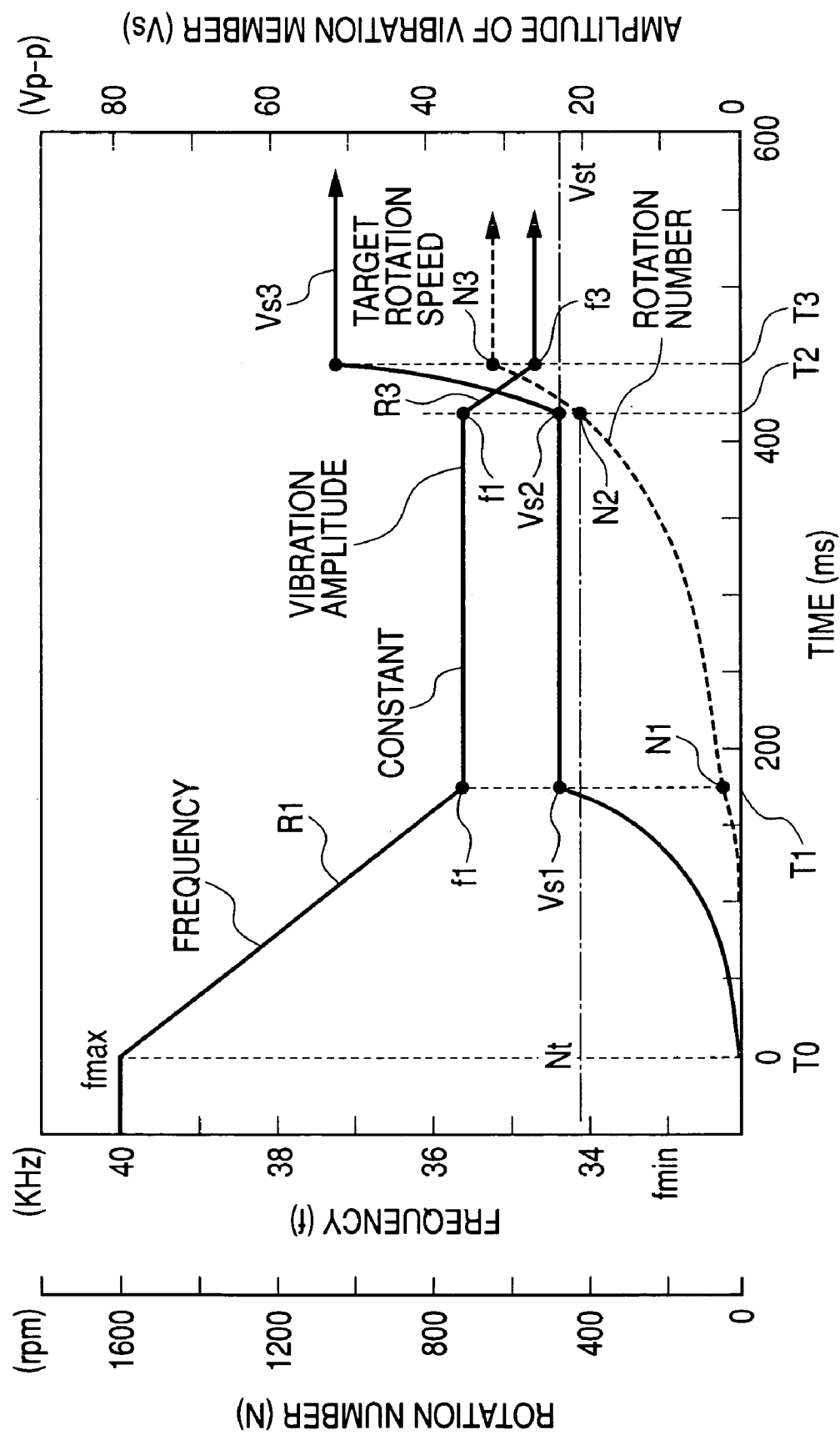
FIG. 4 is a timing chart when starting a motor according to a second embodiment.

FIG. 4 is used to explain a second embodiment of the present invention. Here, FIG. 4 is a diagram showing a time chart of the frequency, the "S" phase voltage Vs, and the motor rpm N. FIG. 4 is similar to FIG. 3, and explains a case where, because moisture is intervening on the slide surface of the vibration-type motor, even when the frequency is changed, the rpm still does not rise in response thereto.

Note that, the circuit structure and the construction of the vibration-type motor in this embodiment are similar to those explained in the first embodiment (FIGS. 1 and 8A through 10).

In the first embodiment, the sweep rate is changed to R2 at step S105 in FIG. 2. However, in this embodiment, instead of changing the sweep rate to R2, the frequency sweep is stopped (i.e., the frequency is kept constant).

In FIG. 4, the frequency is swept down from the frequency fmax at the sweep rate R1, and when the amplitude Vs reaches the predetermined amplitude Vst (at the time T1), a predetermined vibration amplitude at the frequency f1 continues to be applied.

Then, when the rpm N reaches the given rpm Nt (at a time T2) the frequency sweep rate is set to R3 and the sweep down starts again. The sweep down continues until the rpm reaches the target rpm N3. After the rpm reaches the target rpm N3, the drive control on vibration-type motor is performed. This embodiment also obtains effects similar to the effects explained in the first embodiment.

In the above-mentioned operations, when the constant vibration at the frequency f1 is applied for a given period of time and the vibration-type motor still does not start, the drive on the vibration-type motor may be stopped after a given period of time (e.g., 1 sec), and the processing may be repeated again from the start. By repeating this processing, the motor can be started quickly even when the state of the frictional surface in the vibration-type motor has deteriorated.

Note that, in the above-mentioned first and second embodiments, the frequency was changed in a straight line as shown in FIGS. 3 and 4. However, the frequency may also be changed along a curved line.

(Third Embodiment)

A third embodiment of the present invention uses the phase difference $\theta a\text{-}s$ instead of the vibration amplitude Vs to detect the vibration amplitude of the vibration member. Note that the circuit structure and the construction of the vibration-type motor in this embodiment are similar to the constructions explained in the first embodiment.

Here, the phase difference $\theta a\text{-}s$ itself does not directly express the vibration amplitude of the vibration member, but can be used to learn which location is currently vibrating with respect to the resonance frequency. Therefore, if the value of the phase difference $\theta a\text{-}s$ is designated, substantially the same vibration amplitude can be regenerated on the an identical vibration-type motor. Thus, the vibration amplitude of the vibration member can be indirectly monitored based on the phase difference $\theta a\text{-}s$.

Specifically, a phase difference $\theta a\text{-}st$ that corresponds to the vibration status at the time when the above-mentioned predetermined vibration amplitude Vst is excited in the vibration member is pre-stored in the memory, and instead of performing step S103 in FIG. 2, the phase difference $\theta a\text{-}s$ detected based on the output from the phase difference detection circuit 10, and the phase difference $\theta a\text{-}st$, are compared.

That is, when the phase difference $\theta a\text{-}s$ reaches the phase difference $\theta a\text{-}st$ (which corresponds to when the amplitude Vs reaches the predetermined amplitude Vs), it is judged whether or not the rpm of the rotor has reached the predetermined rpm Nt.

Then, before the rpm reaches the predetermined rpm Nt, the sweep rate switches from R1 to R2 as explained in the first embodiment, and when the rpm reaches the predetermined rpm Nt, the sweep rate switches to R3 to raise the rpm N to the target rpm.

Here, when the vibration amplitude Vs of the vibration member is extremely small, the signal at the phase difference $\theta a\text{-}s$ is not precise, and erroneous signals may occur. Therefore, in the case where the phase difference $\theta a\text{-}s$ serves as the guideline for the determination, it is necessary to use a signal obtained after Vs becomes reasonably large.

In this embodiment, when the phase difference between Va and Vs is to be measured, their signals are passed through a comparator and converted into rectangle wave signals. For Vs, the comparator is offset by a fixed level, so that the signal will not be outputted from the comparator if Vs is below a certain level.

That is, when Vs is small and at a level where the phase difference $\theta a\text{-}s$ may be an erroneous signal, the comparator signal from Vs is not outputted. Thus, the phase difference $\theta a\text{-}s$ is not measured and a default value is shown. Accordingly, the phase difference $\theta a\text{-}s$ at the level that will produce erroneous signals is automatically eliminated, and the measurement is taken once the phase difference $\theta a\text{-}s$ produces an accurate signal. Accordingly, extremely reliable control can be performed.

(Fourth Embodiment)

In a fourth embodiment of the present invention, Vs is not used as in the above-mentioned first and second embodiments. Instead, a mechanical arm electric current element in the electric current that is applied to the vibration-type motor serves as a guideline to detect the vibration amplitude of the vibration member, and the drive control on the vibration-type motor is performed.

The mechanical arm electric current increases in proportion to the distortion of the piezoelectric elements, and thus is substantially proportionate to the vibration amplitude of the vibration member. Because of this, if the relationship between the mechanical arm electric current and the vibration amplitude is obtained in advance, based on the mechanical arm electric current, it is possible to perform controls similar to the above-mentioned controls (FIG. 2) that were explained in the above-mentioned embodiments.

In this embodiment, an absolute value of the mechanical arm electric current is detected, and this value serves as the guideline of the vibration amplitude instead of Va that was used in the above-mentioned first embodiment and second embodiment.

Specifically, a mechanical arm electric current Imt that corresponds to the vibration status at the time when the above-mentioned predetermined vibration amplitude Vst is excited in the vibration member, is pre-stored in the memory, and instead of performing step S103 in FIG. 2, a detected mechanical arm electric current Im and a mechanical arm electric current It are compared.

That is, when the mechanical arm electric current Im reaches the mechanical arm electric current Imt (which corresponds to when the amplitude Vs reaches the predetermined amplitude Vst), it is judged whether or not the rotor rpm has reached the predetermined rpm Nt.

Then, before the rpm reaches the predetermined rpm Nt, the sweep rate switches from R1 to R2 as explained in the first embodiment, and when the rpm reaches the predetermined rpm Nt, the sweep rate switches to R3 and raises the rpm N to the target rpm.

Note that the above-mentioned embodiment was explained with respect to the case using the rod-shaped vibration-type motor shown in FIGS. 8A through 10, but the present invention is not restricted to this configuration. Any type (e.g., ring-shaped type, disc-shaped type) can be applied if it is a vibration-type motor that performs frictional drive.

What is claimed is:

1. A control apparatus for controlling drive of a vibration-type drive device in which a vibration member excited by receiving an input of a drive signal and a contact member brought into contact under pressure with the vibration member can move relative to each other, the control apparatus comprising:
    a vibration detection unit which detects a vibration state of the vibration member;
    a speed detection unit which detects a relative movement speed between the vibration member and the contact member; and
    a control unit which outputs the drive signal to the vibration member to control drive of the vibration-type drive device,
    wherein the control unit performs:
    a first frequency control step of lowering a frequency of the drive signal from a predetermined frequency at a first change rate, when the vibration-type drive device is started;
    a determining step of, when the vibration state detected by the vibration detection unit becomes a predetermined state in accordance with a change in the frequency in the first frequency control step, determining whether or not the relative movement speed detected by the speed detection unit has reached a predetermined reference speed;
    a second frequency control step of, when it is determined in the determining step that the relative movement speed has not reached the reference speed, lowering the frequency of the drive signal at a second change rate which is smaller than the first change rate; and
    a third frequency control step of, when the relative movement speed has reached the reference speed, changing the frequency of the drive signal such that the relative movement speed reaches a target speed.

2. A control apparatus according to claim 1, wherein the control unit outputs the drive signal with the second change rate set to zero in the second frequency control step.

3. A control apparatus according to claim 1, wherein the vibration detection unit detects a vibration amplitude of the vibration member.

4. A control apparatus according to claim 3, wherein the vibration member has at least an electro-mechanical energy conversion element, and
    wherein the vibration detection unit detects an amplitude of an output signal from a sensor electrode provided to the electro-mechanical energy conversion element.

5. A control apparatus according to claim 1, wherein the vibration member has at least an electro-mechanical energy conversion element, and
    wherein the vibration detection unit detects a phase difference between a drive signal inputted to the electro-mechanical energy conversion element, and an output signal from a sensor electrode provided to the electro-mechanical energy conversion element.

6. A control apparatus according to claim 1, wherein the vibration detection unit detects a mechanical arm electric current component in the drive signal inputted to the vibration member.

7. A program for causing a computer to execute a control method applied in a control apparatus that controls drive of a vibration-type drive device in which a vibration member excited by receiving an input of a drive signal input and a contact member brought into contact under pressure with the vibration member can move relative to each other, wherein the control method comprises:
    a first frequency control step of lowering a frequency of the drive signal from a predetermined frequency at a first change rate, when the vibration-type drive device is started;
    a detecting step of detecting a vibration state of the vibration member and also detecting a relative movement speed between the vibration member and the contact member;
    a determining step of, when the vibration state has attained a predetermined state in accordance with a change in the frequency in the first frequency control step, determining whether or not the relative movement speed has reached a predetermined reference speed;
    a second frequency control step of, when it is judged in the determining step that the relative movement speed has not reached the reference speed, lowering the frequency of the drive signal at a second change rate which is smaller than the first change rate; and
    a third frequency control step of, when the relative movement speed has reached the reference speed, changing the frequency of the drive signal such that the relative movement speed reaches a target speed.

8. A program according to claim 7, wherein the second change rate is set to zero in the second frequency control step.

* * * * *

UNITED STATES PATENT AND TRADEMARK OFFICE
CERTIFICATE OF CORRECTION

| | | |
|---|---|---|
| PATENT NO. | : 7,116,033 B2 | |
| APPLICATION NO. | : 10/872526 | |
| DATED | : October 3, 2006 | |
| INVENTOR(S) | : Hiroyuki Seki | |

Figure 5:
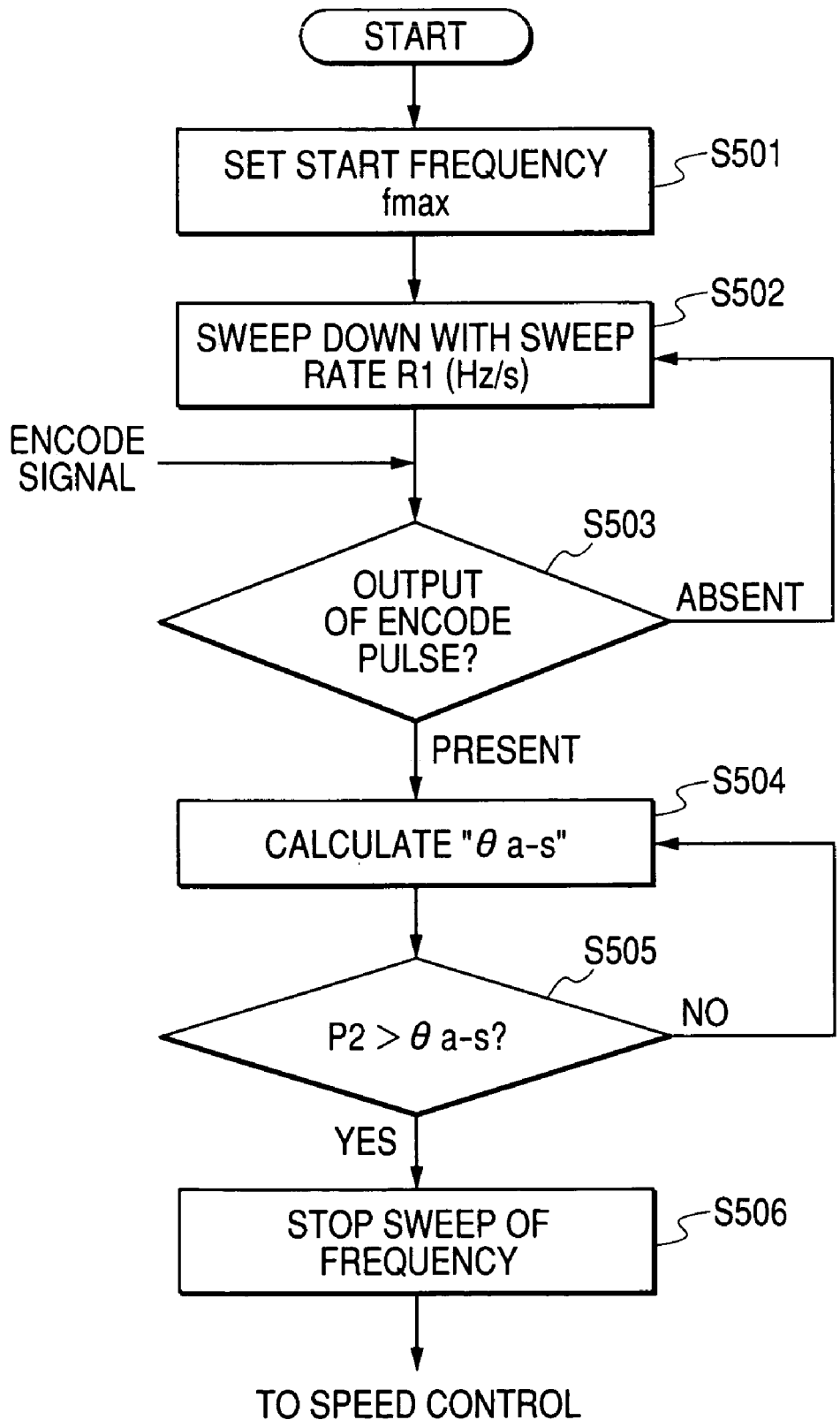
FIG. 5 is a flowchart showing operations when starting a motor according to a conventional example.
Figure 6:
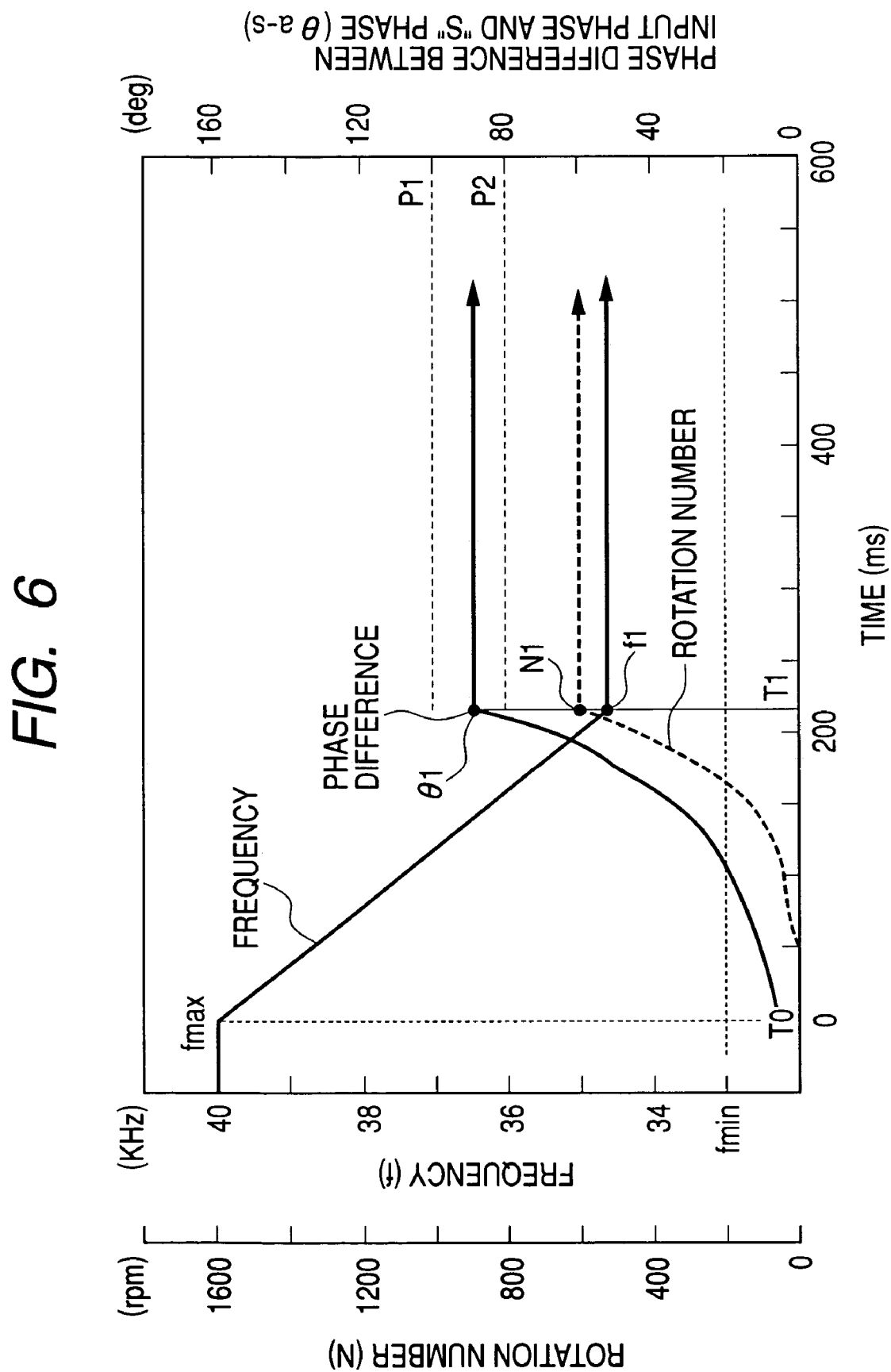
FIG. 6 is a timing chart (normal) when starting the motor according to the conventional example.
Figure 7:
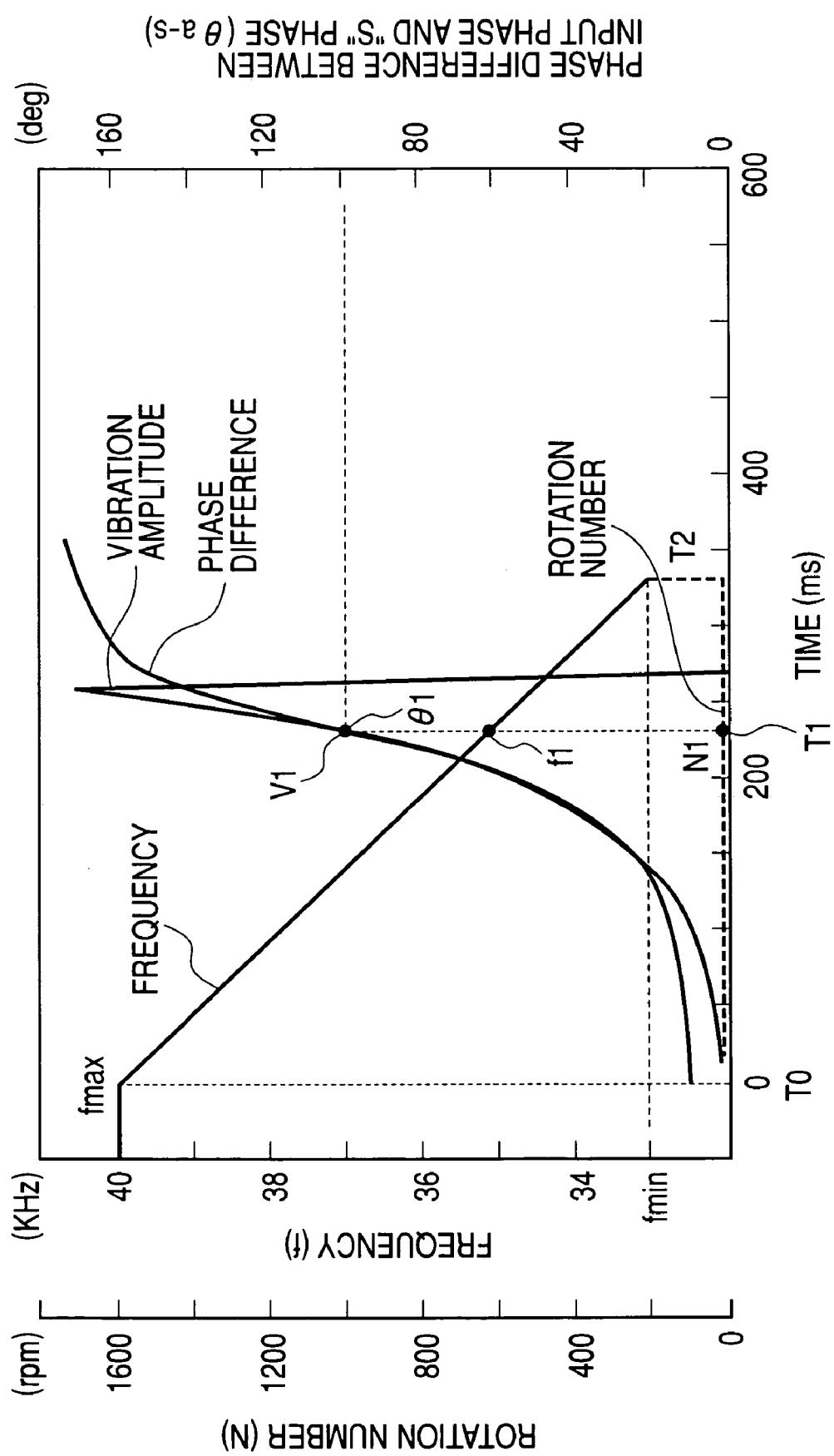
FIG. 7 is a time chart (abnormal) when starting the motor according to the conventional example.

It is certified that error appears in the above-identified patent and that said Letters Patent is hereby corrected as shown below:

Delete drawing sheet 5 of 9 and substitute therefor the drawing sheet, consisting of fig. 5 as shown on the attached page.

Signed and Sealed this

Twenty-fourth Day of July, 2007

JON W. DUDAS
*Director of the United States Patent and Trademark Office*